(12) United States Patent
Ott

(10) Patent No.: US 10,129,618 B2
(45) Date of Patent: Nov. 13, 2018

(54) MULTI-LAYER CONFIGURABLE TIMING SWITCH FABRIC FOR DISTRIBUTING TIMING SOURCES TO TIMING CONSUMERS

(71) Applicant: Keysight Technologies Singapore (Holdings) Pte. Ltd., Singapore (SG)

(72) Inventor: Christopher C. Ott, Austin, TX (US)

(73) Assignee: Keysight Technologies Singapore (Holdings) PTE LTD, Singapore (SG)

( * ) Notice: Subject to any disclaimer, the term of this patent is extended or adjusted under 35 U.S.C. 154(b) by 265 days.

(21) Appl. No.: 14/295,474

(22) Filed: Jun. 4, 2014

(65) Prior Publication Data

US 2015/0358702 A1 Dec. 10, 2015

(51) Int. Cl.
*H04Q 11/08* (2006.01)
(52) U.S. Cl.
CPC .................................... *H04Q 11/08* (2013.01)
(58) Field of Classification Search
CPC ...................................................... H04Q 11/08
See application file for complete search history.

(56) References Cited

U.S. PATENT DOCUMENTS

| 6,204,732 | B1 | 3/2001 | Rapoport et al. |
| 8,583,957 | B2 | 11/2013 | Chandhoke et al. |
| 2007/0294561 | A1* | 12/2007 | Baker ................. G06F 11/1604 714/4.1 |
| 2008/0046774 | A1 | 2/2008 | Hirai et al. |
| 2011/0113160 | A1* | 5/2011 | Duisenberg ........... G06F 3/0607 710/8 |
| 2012/0311116 | A1* | 12/2012 | Jalan ....................... H04L 67/34 709/222 |
| 2013/0347103 | A1* | 12/2013 | Veteikis ................. H04L 43/04 726/22 |
| 2014/0006595 | A1* | 1/2014 | Leighton ................... G06F 1/12 709/224 |
| 2014/0281656 | A1* | 9/2014 | Ruesch ..................... G06F 1/08 713/501 |

* cited by examiner

*Primary Examiner* — Andrew Chriss
*Assistant Examiner* — Voster Preval

(57) ABSTRACT

Multi-layer configurable timing switch fabrics and related methods are disclosed for selectively distributing multiple timing sources to multiple timing consumers. Configurable timing switches are used at central and multiple local levels within the housing for a network-connected processing system to selectively distribute the timing sources to the timing consumers. As such, significant flexibility is provided with respect to what timing sources can be received within the system and how these timing sources are distributed to different timing consumers. Further, timing information can be generated within the network-connected processing system based upon network communications received from timing consumers, and this generated timing information can also be used as timing sources for the multi-layer configurable timing switch fabric.

30 Claims, 12 Drawing Sheets

MULTI-LAYER CONFIGURABLE TIMING SWITCH FABRIC FOR DISTRIBUTING TIMING SOURCES TO TIMING CONSUMERS

TECHNICAL FIELD OF THE INVENTION

This invention relates to network packet communication systems and, more particularly, to distributing timing information for network packet communication systems.

BACKGROUND

Network communication systems often utilize network packets for communications within the network communication system. Timing information related to these network packet communications is often useful so that network nodes can synchronize their own operations, synchronize their operations with other network nodes, and/or determine relative time differences between internal or external events. Timing information can be obtained using a variety of techniques. For example, timing protocols can use GPS (Global Positioning System) or other GNSS (Global Navigation Satellite System) timing signals that are determined using GPS or GNSS receivers. Time code communication formats such as IRIG (inter-range instrumentation group) can also be used to transfer timing information with respect computing systems. Further, packet-based time synchronization techniques can also be used, such as for example, PTP (Precision Time Protocol), CES (Circuit Emulation Service), SAToP (Structure-agnostic Time-Division-Multiplexing over Packet), and/or other packet-based timing protocols.

Certain network-connected processing systems include multiple modular processing blades that are mounted in close proximity to each other as part of larger processing systems. Processing blades can be, for example, electronic components and processing devices that are assembled as a modular component on one or more printed circuit boards. These modular processing blades can then be stacked in close proximity to each other. With respect to timing information, the processing blades are typically configured to use locally generated timing sources, a master timing source distributed to the processing blades within a larger processing system, or a combination of master and local backup timing sources.

FIG. 1A (Prior Art) is a block diagram of an example embodiment for a network-connected processing system having a chassis 100 with processing blades 102, 112, and 122 that utilize local timing sources. As depicted, each individual processing blade 102, 112, and 122 includes an independent, local timing source 104, 114, and 124 as well as a local timing consumer 106, 116, and 126, respectively. The local timing sources 104, 114, and 124 can be, for example, a local clock generator, a local network packet-based timing module, and/or other local timing source. The timing consumers 106, 116, and 126 can be, for example, any logic circuitry or other electronic component resident on the blade that uses the timing information generated by its respective local timing source 104, 114, and 124. As such, each timing consumer 106, 116, and 126 on each blade 102, 112, and 122 consumes timing signals from its own local timing source 104, 114, and 124 for use in its operations.

FIG. 1B (Prior Art) is a block diagram of an example embodiment for a network-connected processing system having a chassis 100 with processing blades 102, 112, and 122 that receive a timing signal 156 from a master timing source 154. As depicted, the master timing source 154 is included on a master timing blade 152 that is also within the chassis 100. The master timing signal 156 is then distributed within chassis 100 to each of the blades 102, 112, and 122. The timing consumers 106, 116, and 126 for each of the blades 102, 112, and 122 consumes this master timing signal 156 for use in its operations. It is noted that the master timing signal 156 can be communicated within the chassis 100 to each blade 102, 112, and 122 through backplane connections and/or through other connections that are external to the blades 102, 112, and 122. Thus, in contrast to FIG. 1A (Prior Art), a centrally-generated master timing signal 156 is used by the consumers 106, 116, and 126 on the blades 102, 112, and 122.

FIG. 1C (Prior Art) is a block diagram of an example embodiment for a network-connected processing system having a chassis 100 with processing blades 102, 112, and 122 that receive a master timing signal 156 and have locally generated timing information that is used for backup timing. As with FIG. 1B (Prior Art), a timing signal 156 is generated by a master timing source 154 on a master timing blade 152, and this master timing signal 156 is distributed to the processing blades 102, 112, and 122 and is then consumed by timing consumers 106, 116, and 126. In addition, similar to FIG. 1A (Prior Art), each blade 102, 112, and 122 also has its own local backup timing source 104, 114, and 124, respectively. As such, each consumer 106, 116, and 126 on each blade 102, 112, and 122 also consumes timing signals from its own local timing source 104, 114, and 124 for use in its operations in addition to the master timing signal 156. For example, when the master timing signal 156 is not available due to clock failure or signal disruption, the timing consumers 106, 116, and 126 can use timing signals from their respective local timing sources 104, 114, and 123 as backup timing information.

SUMMARY OF THE INVENTION

Multi-layer configurable timing switch fabrics and related methods are disclosed for selectively distributing multiple timing sources to multiple timing consumers. Configurable timing switches are used at central and multiple local levels within the housing for a network-connected processing system to selectively distribute the timing sources to the timing consumers. As such, significant flexibility is provided with respect to what timing sources can be received within the system and how these timing sources are distributed to different timing consumers. Further, timing information can be generated within the network-connected processing system based upon network communications received from timing consumers, and this generated timing information can also be used as timing sources for the multi-layer configurable timing switch fabric. Different features and variations can be implemented, as desired, and related systems and methods can be utilized, as well.

In one embodiment, a method is disclosed for distributing timing information within a network-connected processing system including operations performed at a timing distribution switch and at processing blades coupled within a housing for the network-connected processing system. At the timing distribution switch within the network-connected processing system, the method includes receiving timing information from a plurality of timing sources, and selectively distributing the timing information to a plurality of processing blades based upon pre-configured distribution settings for the timing distribution switch. At each of the plurality of processing blades within the network-connected processing system, the method includes receiving the selectively distributed timing information at a local timing distribution switch, and selectively distributing the timing information to one or more user ports based upon pre-configured distribution settings for the local timing distribution switch.

For other embodiments, the selectively distributing step at the timing distribution switch includes receiving timing information from each timing source at different ingress ports for the timing distribution switch and forwarding the timing information to egress ports for the timing distribution switch based upon the pre-configured distribution settings for the timing distribution switch. In addition, the selectively distributing step for each processing blade can further include receiving timing information from the timing distribution switch at different ingress ports for the local timing distribution switch and forwarding the timing information to egress ports for the local timing distribution switch based upon the pre-configured distribution settings for the local timing distribution switch.

For additional embodiments, the plurality of timing sources can include one or more timing sources external to the housing for the network-connected processing system. For other additional embodiments, the plurality of timing sources can include one or more timing sources internal to the housing for the network-connected processing system.

For further embodiments, the method can include receiving configuration settings for the timing distribution switch from a user interface, storing the configuration settings in one or more configuration files, and using the configuration settings to provide the pre-configured distribution settings for the timing distribution switch. In addition, the method can further include receiving configuration settings for the local timing distribution switches from a user interface, storing the configuration settings in one or more configuration files, and using the configuration settings to provide the pre-configured distribution settings for the local timing distribution switches.

For still further embodiments, the method can include generating time information with one or more of the processing blades from communications received through one or more of the user ports and sending the generated timing information to the timing distribution switch as timing information from one or more timing sources.

For additional embodiments, the method can further include selectively distributing timing information to an external network-connected processing system that also includes a timing distribution switch. The method can also further include receiving timing information associated with one or more timing sources from an external network-connected processing system that also includes a timing distribution switch.

For other embodiments, the method can also include receiving timing information at the timing distribution switch using a first protocol and distributing the timing information using a second protocol different from the first protocol. For further embodiments, the method can include receiving timing information at the plurality of processing blades using a first protocol and distributing the timing information using a second protocol different from the first protocol.

For further embodiments, the timing distribution switch and the plurality of processing blades can each include one or more processing devices. Still further, the timing distribution switch and the plurality of processing blades can each include one or more configurable logic devices.

In one other embodiment, a network-connected processing system having timing distribution is disclosed having a timing distribution switch, a plurality of processing blades, and a timing configuration controller coupled within a housing for the network-connected processing system. The timing distribution switch includes a plurality of input ports configured to receive timing information from a plurality of timing sources, includes a plurality of output ports, and is configured to distribute the timing information to the plurality of output ports based upon pre-configured distribution settings. Each of the plurality of processing blades includes input ports coupled to receive timing information from the timing distribution switch, includes a local timing distribution switch, includes a plurality of user ports, and is configured to distribute timing information to the plurality of user ports based upon pre-configured distribution settings for the local timing distribution switch. The timing configuration controller is configured to apply pre-configured distribution settings to the timing distribution switch and to each of the processing blades.

For other embodiments, the plurality of timing sources can include one or more timing sources external to the housing for the network-connected processing system. For other additional embodiments, the plurality of timing sources can include one or more timing sources internal to the housing for the network-connected processing system.

For further embodiments, the pre-configured distributions settings for the timing distribution switch can be based upon configuration settings stored in one or more configuration files within the network-connected processing system. In addition, the pre-configured distributions settings for the local timing distribution switches can be based upon configuration settings stored in one or more configuration files within the network-connected processing system.

For still further embodiments, the plurality of processing blades can be configured to generate timing information from communications received through one or more of the user ports and to send the generated timing information to the timing distribution switch as timing information from one or more timing sources.

In additional embodiments, the timing distribution switch can be configured to selectively distributing timing information to an external network-connected processing system. Also, the timing distribution switch can be further configured to receive timing information associated with one or more timing sources from an external network-connected processing system.

For other embodiments, the timing distribution switch can be further configured to receive timing information using a first protocol and to distribute timing information using a second protocol different from the first protocol based upon the pre-configured distribution settings. For further embodiments, the local timing distribution switches can be configured to receive timing information using a first protocol and to distribute the timing information using a second protocol different from the first protocol based upon the pre-configured distribution settings.

For further embodiments, the timing distribution switch and the plurality of processing blades can each include one or more processing devices. Still further, the timing distribution switch and the plurality of processing blades can each include one or more configurable logic devices.

Different features and variations can also be implemented, as desired, and related systems and methods can be utilized, as well.

DESCRIPTION OF THE DRAWINGS

It is noted that the appended drawings illustrate only example embodiments of the invention and are, therefore, not to be considered limiting of its scope, for the invention may admit to other equally effective embodiments.

DETAILED DESCRIPTION OF THE INVENTION

Multi-layer configurable timing switch fabrics and related methods are disclosed for selectively distributing multiple timing sources to multiple timing consumers. Configurable timing switches are used at central and multiple local levels within the housing for a network-connected processing system to selectively distribute the timing sources to the timing consumers. As such, significant flexibility is provided with respect to what timing sources can be received within the system and how these timing sources are distributed to different timing consumers. Further, timing information can be generated within the network-connected processing system based upon network communications received from timing consumers, and this generated timing information can also be used as timing sources for the multi-layer configurable timing switch fabric. Different features and variations can be implemented, as desired, and related systems and methods can be utilized, as well.

The disclosed embodiments in part provide a dynamically configurable timing distribution switch architecture that receives timing information from multiple different timing sources and distributes these different timing sources to multiple different timing consumers. Multi-layer architectures are also provided so that a central timing switch distributes timing information among multiple processing blades, and each processing blade further includes a timing switch that distributes timing information among multiple different timing consumers. Further, the plurality of different processing blades can be included within a single chassis for network-connected system. The multi-layer configurable timing switch architecture can be implemented, for example, using configurable logic devices such as CPLDs (complex programmable logic devices), FPGAs (field programmable gate arrays), and/or other configurable logic devices. These configurable logic devices can be dynamically configured and re-configured to accommodate various timing distribution configurations through distribution configuration settings applied to the configurable logic devices. Further, the processing blades within the network-connected system can include blades that generate local timing sources but have no local clock consumers, blades that have one or more timing consumers but do not generate local timing sources, and/or blades that both generate local timing sources and include one or more local timing consumers. Other configurations could also be used while still utilizing the multi-layer configurable timing switch fabric embodiments described herein.

Figure 1A:
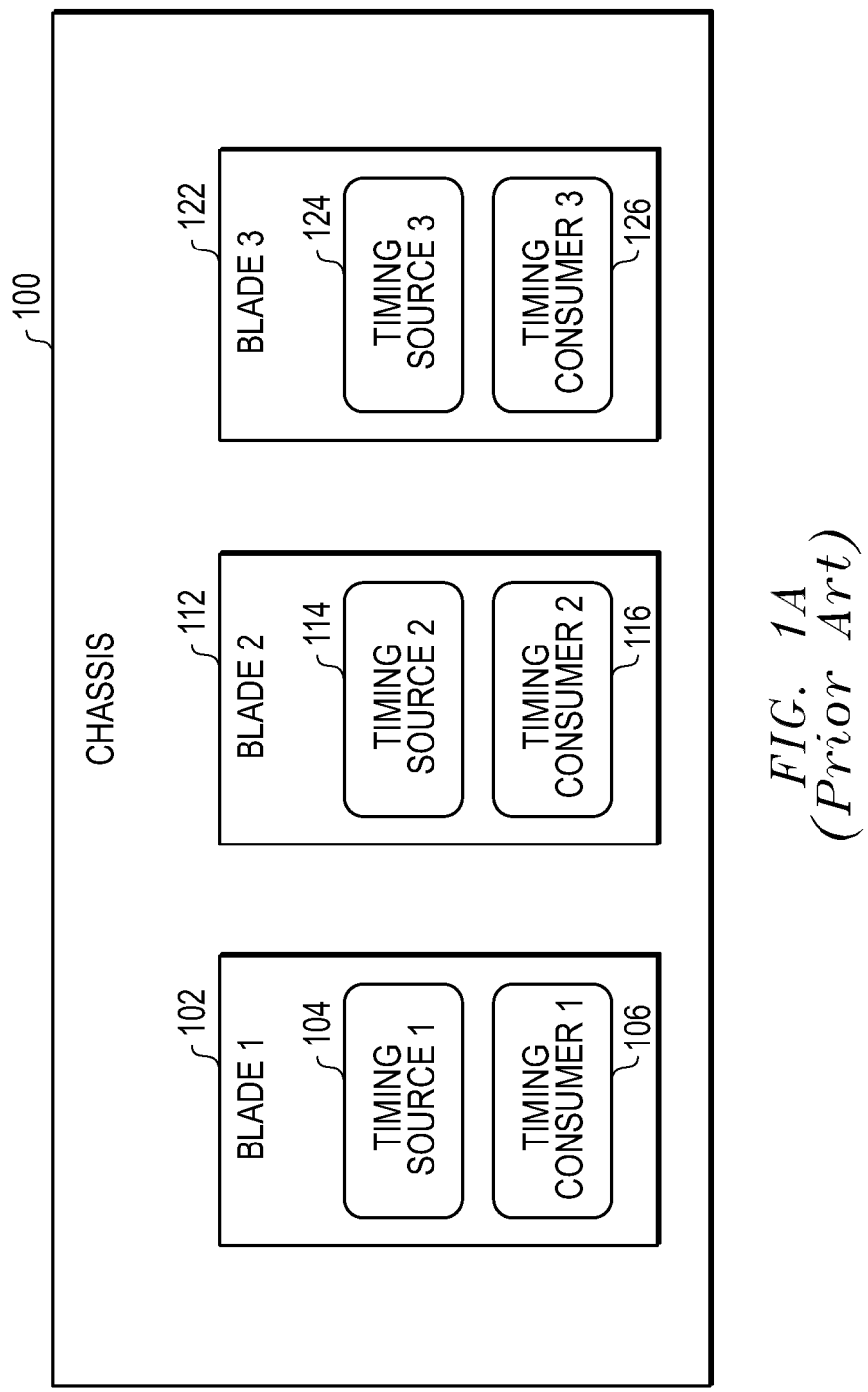
FIG. 1A (Prior Art) is a block diagram of an example embodiment for a network-connected processing system having a chassis with processing blades that utilize local timing sources.
Figure 1B:
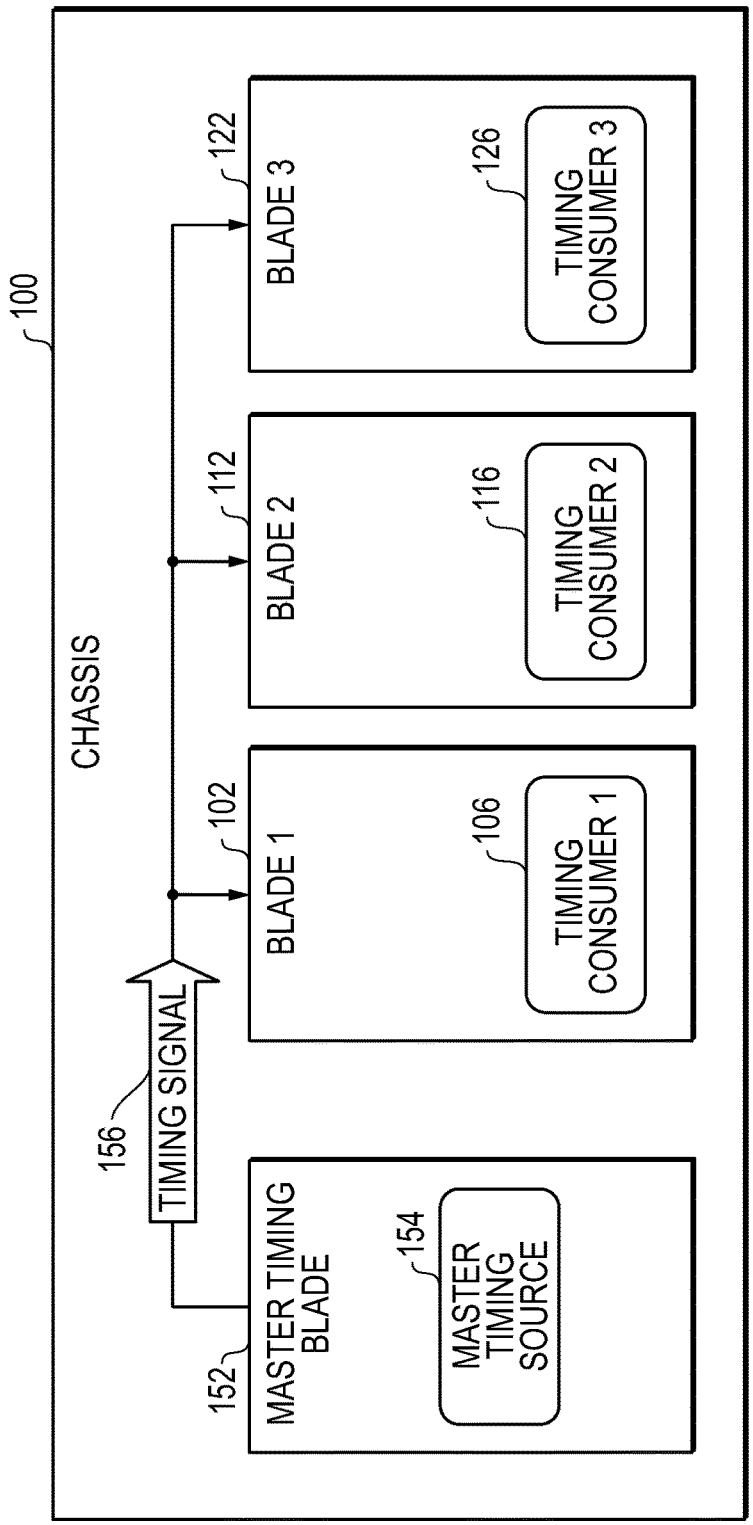
FIG. 1B (Prior Art) is a block diagram of an example embodiment for a network-connected processing system having a chassis with processing blades that receive a master timing signal from a master timing blade.
Figure 1C:
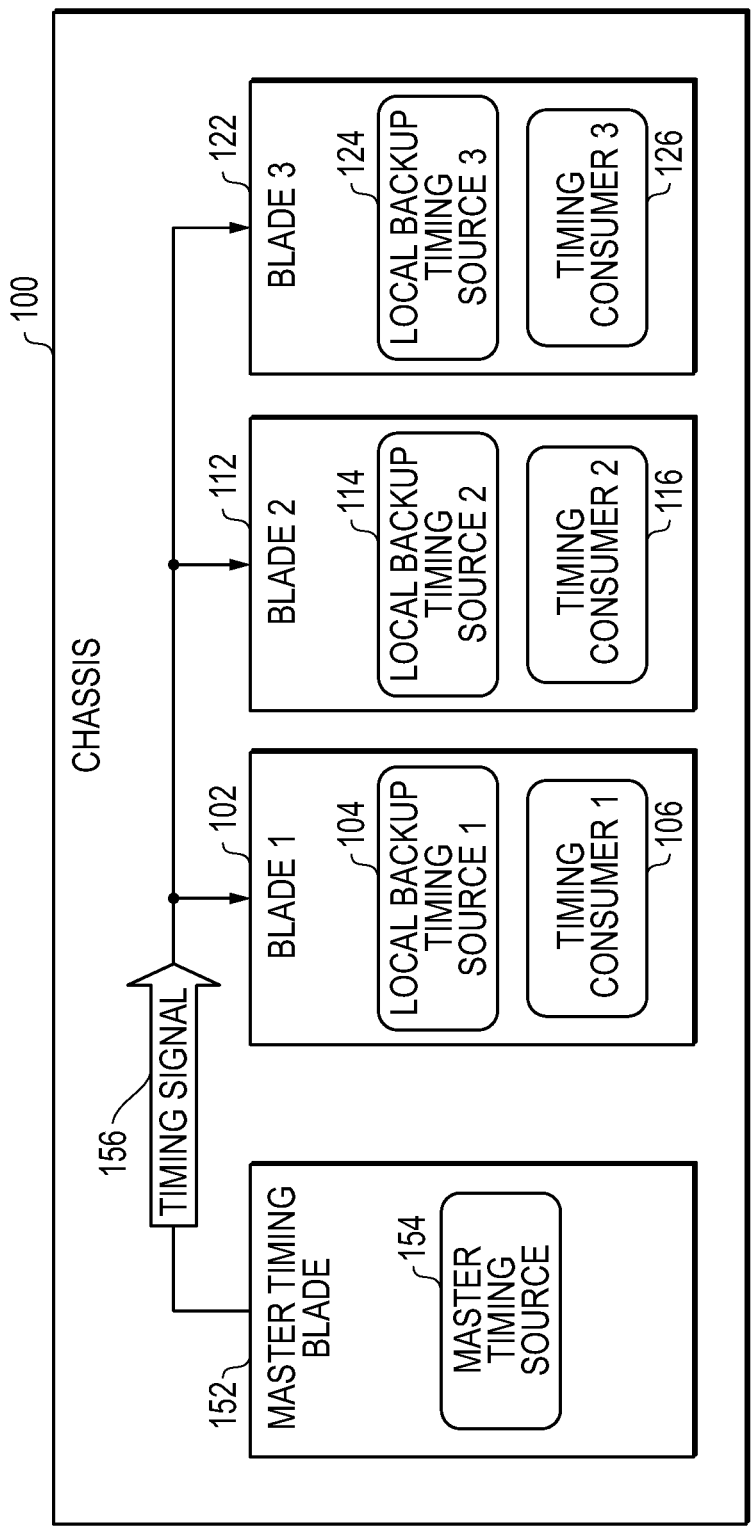
FIG. 1C (Prior Art) is a block diagram of an example embodiment for a network-connected processing system having a chassis with processing blades that receive a master timing signal and have locally generated timing information that is used for backup timing.
Figure 2:
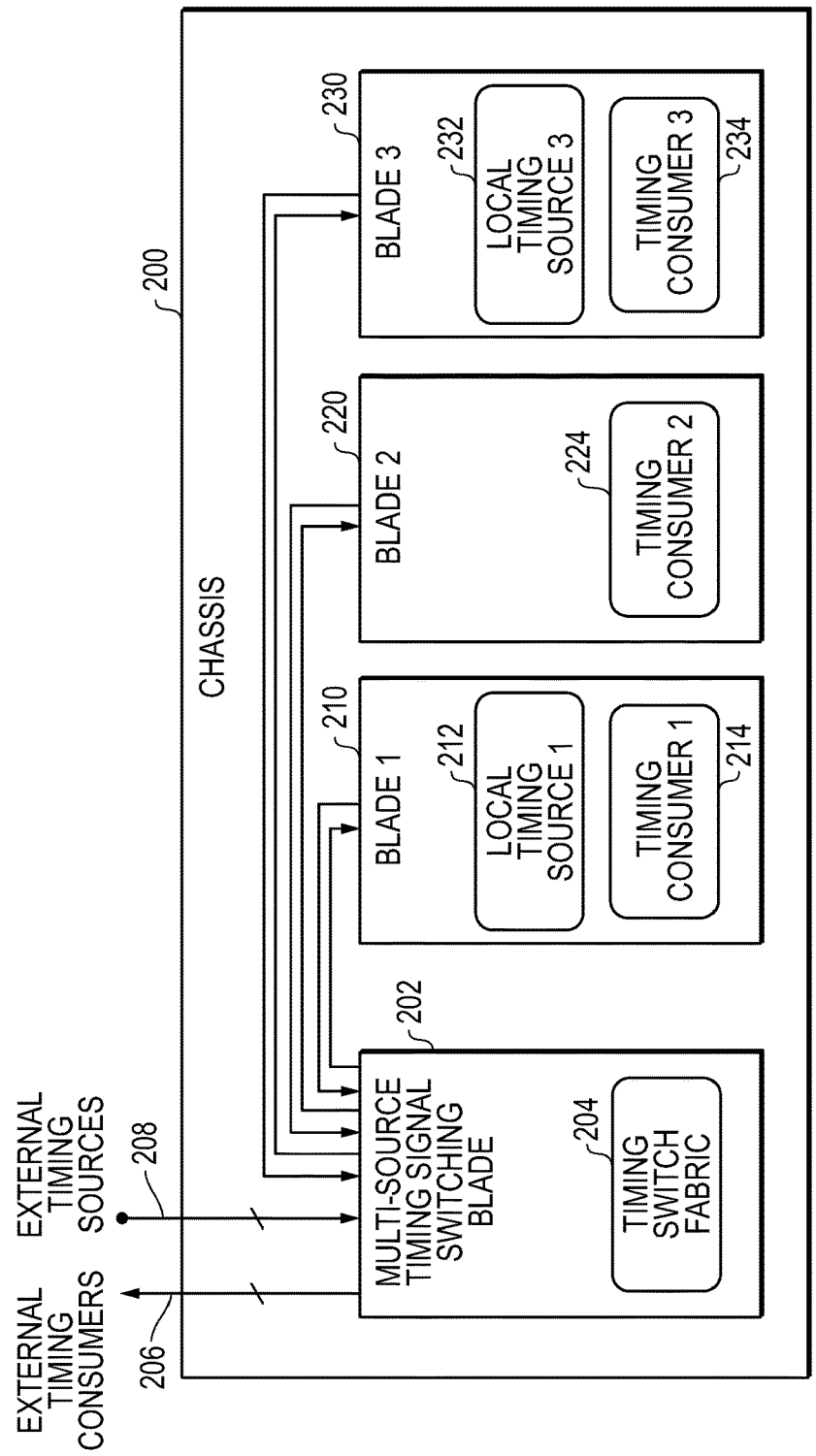
FIG. 2 is a general block diagram of an embodiment for a network-connected system including a chassis having a timing switch that distributes timing information from multiple timing sources to multiple processing blades.

FIG. 2 is a general block diagram of an embodiment 200 for a network-connected system including a chassis 200 having a timing switch 204 that distributes timing information from multiple timing sources to processing blades 210, 220, and 230. For the embodiment 200 depicted, the timing switch 204 is implemented as part of a multi-source timing signal switching blade 202. The switching blade 202 is configured to receive timing signals from the blades 210, 220, and 230 that generate or recover local timing signals as well as from one or more external timing sources through connections 208. The timing switch 204 receives these timing signals and distributes them to timing consumers 214, 224, and 234 and/or external timing consumers 206 based upon configurable timing distribution settings for the timing switch 204. For the embodiment 200, processing blade 210 has a local timing consumer 214 and a local timing source 212. Similarly, processing blade 230 has a local timing consumer 234 and a local timing source 232. Processing blade 220 has a local timing consumer 224 and no local timing source. It is noted that although the processing blades 210, 220, and 230 are depicted in embodiment 200 as each having one local timing consumer, they could also have multiple local timing consumers as described in more detail below. Further, it is noted that although the processing blades 210, 220, and 230 are depicted in embodiment 200 as each having one local timing source, they could generate multiple local timing sources as also described in more detail below. Other variations could also be implemented.

Figure 3A:
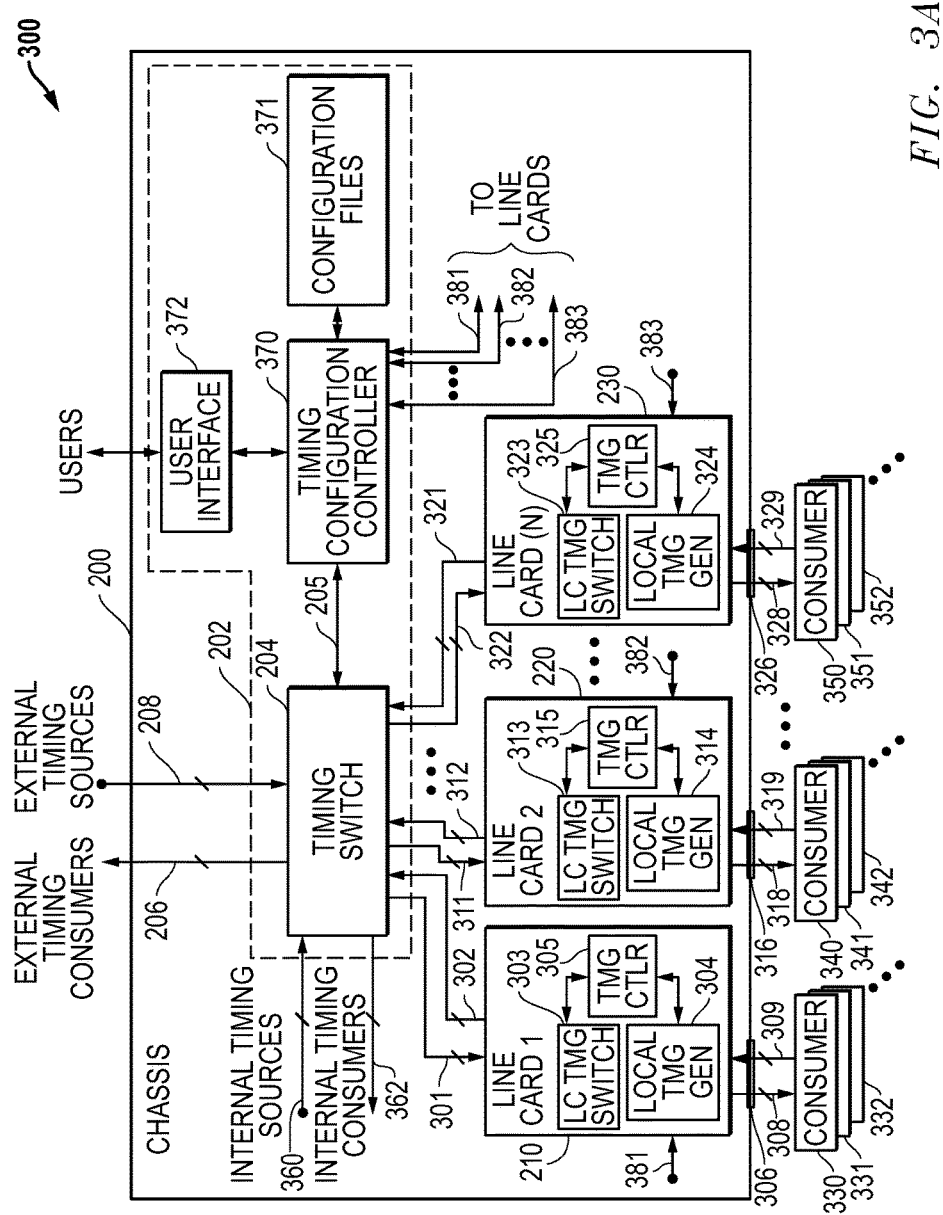
FIG. 3A is a detailed block diagram of an embodiment for a network connected system having a chassis and multiple sets of timing consumers coupled to user ports.

FIG. 3A is a detailed block diagram of an embodiment 300 for a network connected system having a chassis 200 and multiple sets of timing consumers coupled to user ports. For the embodiment depicted, the timing signal switching blade 202 includes a timing switch 204 as well as a timing configuration controller 370 coupled to the timing switch 204. A user interface 372 is coupled to the timing configuration controller 370 to allow users to configure timing distribution settings 205 that determine how the timing switch 204 will distribute timing signals to timing consumers. The user interface 372, for example, can be a network accessible interface. The timing configuration controller 370 is further configured to apply these timing distribution settings 205 to the timing switch 204 to cause the timing switch 204 to distribute timing signals according to the applied settings. One or more different configuration files 371 can be generated and stored for the timing configuration controller. For example, configuration files 371 can be generated and defined through the user interface 372 and then stored in a data storage medium on the timing signal switching blade 202. The data storage medium can be, for example, volatile or non-volatile memory within which the configuration data for the one or more configuration files 371 is stored. For example, the data storage medium for the configuration files can be implemented using one or more non-transitory tangible computer readable mediums (e.g., non-volatile memory). During operation, volatile memory could also be used, such as dynamic random access memory, as data storage for the configuration files 371.

The configuration files 371 can also include timing distribution settings 381, 382 . . . 383 that are provided by the timing configuration controller 370 to local timing controllers 305, 315 . . . 325 within the line cards 210, 220 . . . 230. These further timing distribution settings 381, 382 . . . 383 are applied to local timing switches 303, 313 . . . 323 on the line cards 210, 220 . . . 230 to determine how timing signals received from the timing switch 204 and/or from the local timing generators 304, 314 . . . 324 are distributed back to the switching blade 202 and/or to timing consumers connected to the line cards 210, 220 . . . 230. In addition, these further timing distribution settings 381, 382 . . . 383 determine what local timing signals are captured and/or are otherwise generated by the local timing generators 304, 314 . . . 324 for each of the line cards 210, 220 . . . 230.

As described above, the timing switch 204 receives timing signals from multiple different timing sources and distributes these timing signals to multiple different timing consumers or processing blades. For embodiment 300, the processing blades described above are implemented as N different line cards 210, 220 . . . 230. And each of these line cards 210, 220 . . . 230 can be a timing source that provides one or more timing signals to the timing switch 204 through connections 302, 312 . . . 322, respectively. The timing switch 204 can also receive timing signals from other internal timing sources within the chassis 200 through connections 360 and from external timing sources through connections 208. The timing switch 204 can then distribute any one of these signal sources to any one of the timing consumers or destinations. This distribution can include timing signals distributed to external timing consumers through connections 206, distributed to other internal timing consumers through connections 362, and distributed to timing consumers connected to the line cards 210, 220 . . . 230 through connections 301, 311 . . . 321, respectively. As indicated above, configuration files 371 and associated configuration settings 205 applied to the timing switch 204 by timing configuration controller 370 determine how the timing signals from the timing sources are distributed by the timing switch 204.

Looking in more detail to the first line card 210, the first line card 210 includes a local timing switch 303, a local timing generator 304, and a local timing controller 305. The first line card 210 is also coupled to multiple timing consumers 330, 331, 332 . . . through connections 308 and 309 to user ports 306. Similarly, the second line card 220 includes a local timing switch 313, a local timing generator 314, and a local timing controller 315. The second line card 210 is also coupled to multiple timing consumers 340, 341, 342 . . . through connections 318 and 319 to user ports 316. Additional line cards are similarly configured with the Nth line card 230 also including a local timing switch 323, a local timing generator 324, and a local timing controller 325. The Nth line card 230 is also coupled to multiple timing consumers 350, 351, 352 . . . through connections 328 and 329 to user ports 326. The local timing generators 304, 314, and 324 can be, for example, local time stamp engines that add timestamps to packets received from timing consumers, local timing capture blocks that recover timing signals from packets received from timing consumers, and/or any other desired timing signal generator that is configured to generate, recover, or otherwise produce a timing signal.

It is noted that the connections to the timing switch 204 each represent multiple configurable links. For example, in one embodiment, connections 301, 302, 311, 312, 321, and 322 can each be five (5) different configurable links between the timing switch 204 and the respective line cards. Further, in one embodiment, connections 360, 362, 206, and 208 can each be three (3) different configurable links between the timing switch and the sources/consumers. For additional implementations, different numbers of configurable links could be utilized, as desired.

It is noted that while the embodiments herein focus on timing information being communicated among network-connected systems, the network-connected systems may also communicate other information in addition to timing information. Further, network packets can be used for these communications, and timing information can be associated with these network packets using a variety of techniques. For example, timing information can be embedded within existing network packets, can be added as additional fields to these network packets, and/or otherwise associated with the network packets. For communications internal to a chassis of the network-connected systems, the timing information can also be communicated using electrical connections or buses configured according to a variety of communication protocols, as desired.

It is again noted that configurable logic devices, such as CPLDs and/or FPGAs, can be used within the chassis 200 to provide the timing distribution functionality described herein, such as for example, to implement the timing switches 205, 381, 382 . . . 383. Further, one or more processors (e.g., microcontrollers, microprocessors, central processing units, etc.) can also be used to control and implement the functionality described herein, such as for example, to implement the timing controllers 370, 305, 315 . . . 325. The multiple timing signals received by the timing switch 204 may be received in multiple different formats and protocols and may be re-formatted or re-configured prior to transmission to a particular timing consumer. In this manner, the timing switch 204 can accommodate a wide variety of timing formats or protocols that may be used by timing sources and timing consumers. For example, as described above, timing formats can include GPS or other GNSS timing signals, time code communication formats such as IRIG, and/or packet-based time synchronization techniques such a PTP, CES, SAToP, and/or other packet-based timing protocols. Further, new timing formats and protocols can also be accommodated by the timing switch 204 as distribution configuration settings for the timing switch 204 can be reconfigured to support any such new formats or protocols. Other variations can also be implemented while still utilizing the configurable timing switch fabric embodiments described herein.

Figure 3B:
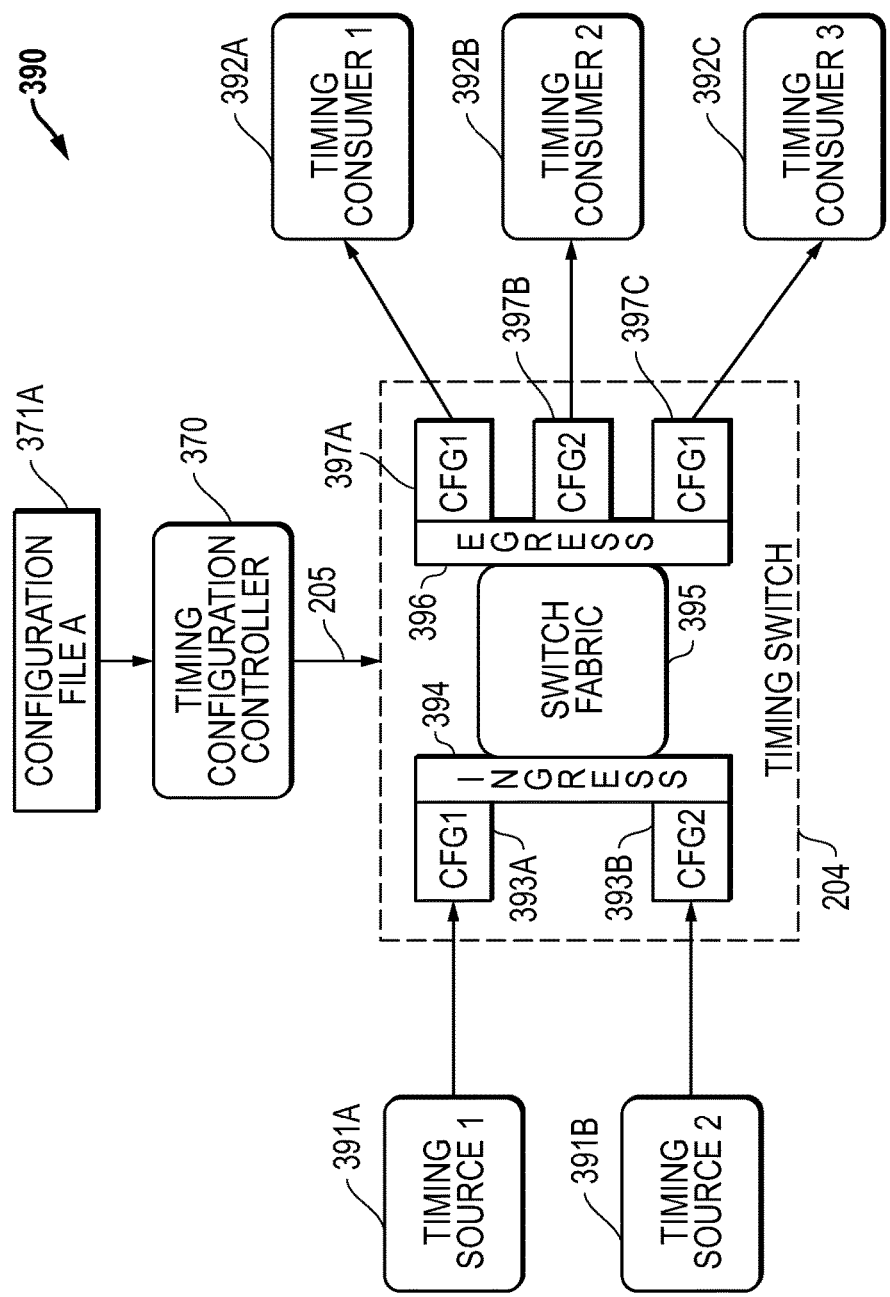
FIG. 3B is a block diagram of an example embodiment where settings from a configuration file are applied to configure a timing switch.

FIG. 3B is a block diagram of an example embodiment 390 where settings from a configuration file are applied to configure a timing switch. For embodiment 390, a configuration file (FILE A) 371A is used by timing configuration controller 370 to apply timing configuration settings 205 to the timing switch 204. Further, the timing switch 204 is receiving timing information from timing sources 391A and 391B through ingress ports 394 and is distributing timing information to three timing consumers 392A, 392B, and 392C through egress ports 396. A switch fabric 395, such as a cross bar switch, within the timing switch 204 is used to forward the timing information from the ingress ports 394 to the egress ports 396. As described above, the timing consumers 392A, 392B, and 392C can be line cards 210, 220 . . . 230 which further distribute timing information and/or other internal timing consumers 362 or external timing consumers.

The timing switch 204 distributes timing information from ingress ports 394 to egress ports 396 through the switch fabric 395 based upon the configuration settings 205. Further, the ingress ports 394 and egress ports 396 are configured to have the format or protocol for the timing sources being received. For embodiment 390, the ingress port 393A is configured to have a first configuration (CFG1) that matches the format or protocol for the timing information from the first timing source 391A. The ingress port 393B is configured to have a second configuration (CFG2) that matches the format or protocol for the timing information from the second timing source 391B. The egress ports 397A and 397C are each configured to have a first configuration (CFG1) that matches the format or protocol for the timing information from the first timing source 391A that is being distributed to the first timing consumer 392A and the third timing consumer 397C. The egress port 397B is configured to have a second configuration (CFG2) that matches the format or protocol for the timing information from the second timing source 391B that is being distributed to the second timing consumer 392B.

As a further example, the first timing source 391A could be a GPS receiver that is providing timing information in the format of a network packet including time-of-day information. As such, the configuration settings 205 would configure the ingress port 393A and the egress ports 397A and 397C to receive and transmit packets with this time-of-day information. As another example, the second timing source 391B could be a packet-based timing protocol that adds timestamps to network packets. As such, the configuration settings 205 would configure the ingress port 393B and the egress port 397B to receive and transmit packets with these timestamps. Thus, the timing switch 204 is configurable to adjust how it receives and sends timing information based upon the configuration settings 205 that determine how the timing information is to be distributed.

It is further noted that the local timing switches 303, 313 . . . 323 can be implemented similar to the timing switch 204 so that each distributes timing information from ingress ports to egress ports through a switch fabric based upon its individual configuration settings 381, 382 . . . 383. As such, the central timing switch 204 and the local timing switches 303, 313 . . . 323 provide a configurable multi-layer timing switch fabric for distributing timing information from multiple different timing sources to multiple different timing consumers at various layers within the timing switch fabric. Further, it is noted that the central timing switch 204 and the local timing switches 303, 313 . . . 323 can be implemented, for example, using FPGAs available from Altera Corporation and/or Xilinx, Inc. that have configurable ingress ports and egress ports based upon configuration settings as well as using switch devices available from Broadcom Corporation that provide cross bar switch connectivity. Other implementations could also be utilized.

Figure 3C:
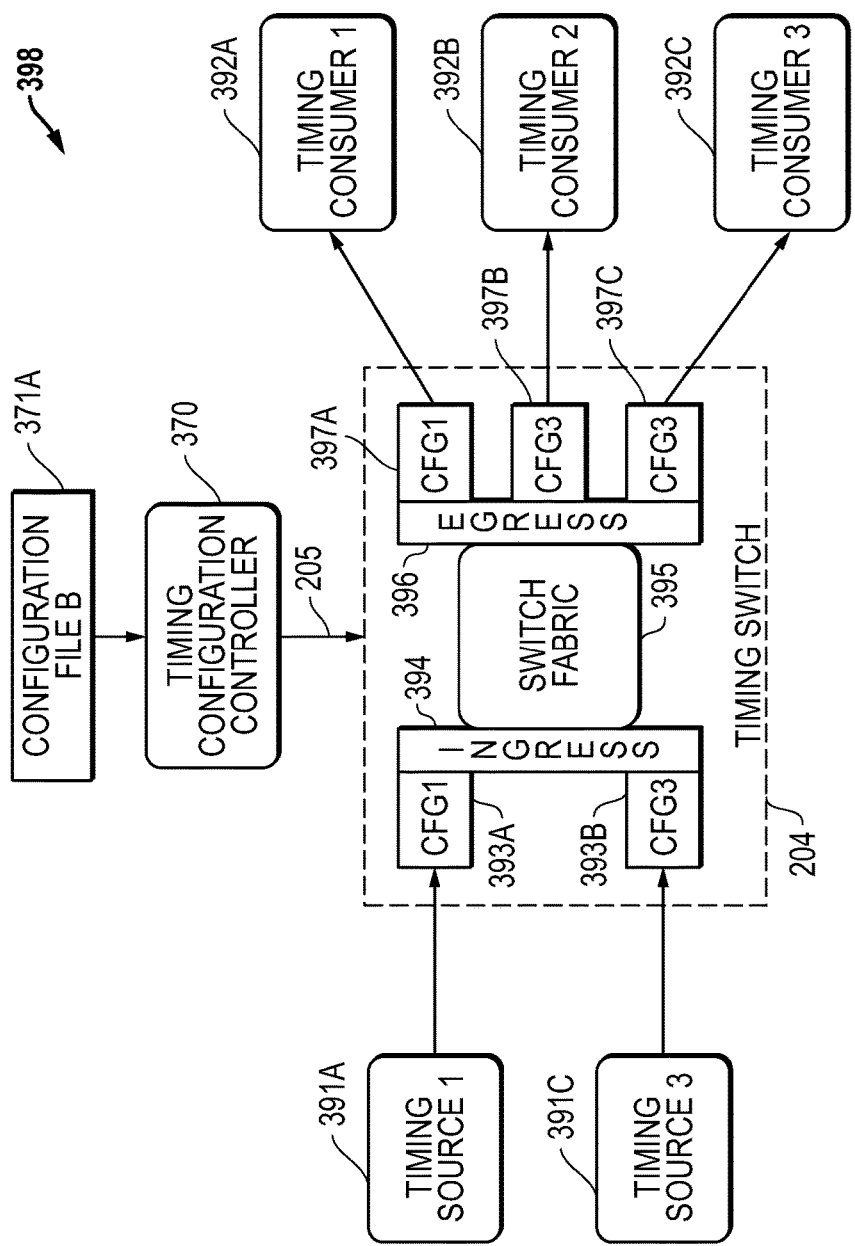
FIG. 3C is a block diagram of an example embodiment where settings from a different configuration file is applied to reconfigure a timing switch.

FIG. 3C is a block diagram of an example embodiment 398 where settings from a different configuration file are applied to reconfigure a timing switch. For embodiment 398, a configuration file (FILE B) 371B that is different from configuration file (FILE A) 371A in FIG. 3B is used by timing configuration controller 370 to apply new timing configuration settings 205 to reconfigure the timing switch 204. Further, the timing switch 204 is now receiving timing information from timing sources 391A and 391C through ingress ports 394 and is distributing timing information to three timing consumers 392A, 392B, and 392C through egress ports 396. While only the third timing source 391C is different from embodiment 390 in FIG. 3B, it is recognized that other timing sources could be changed, and changes could also be made to the timing consumers as well. Further, changes could also be made with respect to the ingress/egress ports to which the timing sources and timing consumers are connected. Thus, it is evident that the configurable nature of the timing switch fabric embodiments described herein allow for wide flexibility in receiving and distributing timing information.

As described above, the ingress ports 394 and egress ports 396 are configured to have the format or protocol for the timing sources being received. As such for embodiment 398, the ingress port 393A is configured to have a first configuration (CFG1) that matches the format or protocol for the timing information from the first timing source 391A. The ingress port 393B is configured to have a third configuration (CFG3) that matches the format or protocol for the timing information from the third timing source 391C. The egress port 397A is configured to have a first configuration (CFG1) that matches the format or protocol for the timing information from the first timing source 391A that is being distributed to the first timing consumer 392A. The egress ports 397B and 397C are configured to have a third configuration (CFG3) that matches the format or protocol for the timing information from the third timing source 391C that is being distributed to the second timing consumer 392B and the third timing consumer 392C.

As a further example, the first timing source 391A could again be a GPS receiver that is providing timing information in the format of a network packet including time-of-day information. As such, the configuration settings 205 would configure the ingress port 393A and the egress ports 397A to receive and transmit packets with this time-of-day information. As another example, the third timing source 391C could provide timing information in an IRIG (inter-range instrumentation group) time code format. As such, the configuration settings 205 would configure the ingress port 393B and the egress ports 397B and 397C to receive and transmit packets with this IRIG time code information.

It is again noted that the local timing switches 303, 313 . . . 323 can be implemented similar to the timing switch 204 so that each distributes timing information from ingress ports to egress ports through a switch fabric based upon its individual configuration settings 381, 382 . . . 383. It is also again noted that the central timing switch 204 and the local timing switches 303, 313 . . . 323 provide a configurable multi-layer timing switch fabric for distributing timing information from multiple different timing sources to multiple different timing consumers at various layers within the timing switch fabric.

Figure 4A:
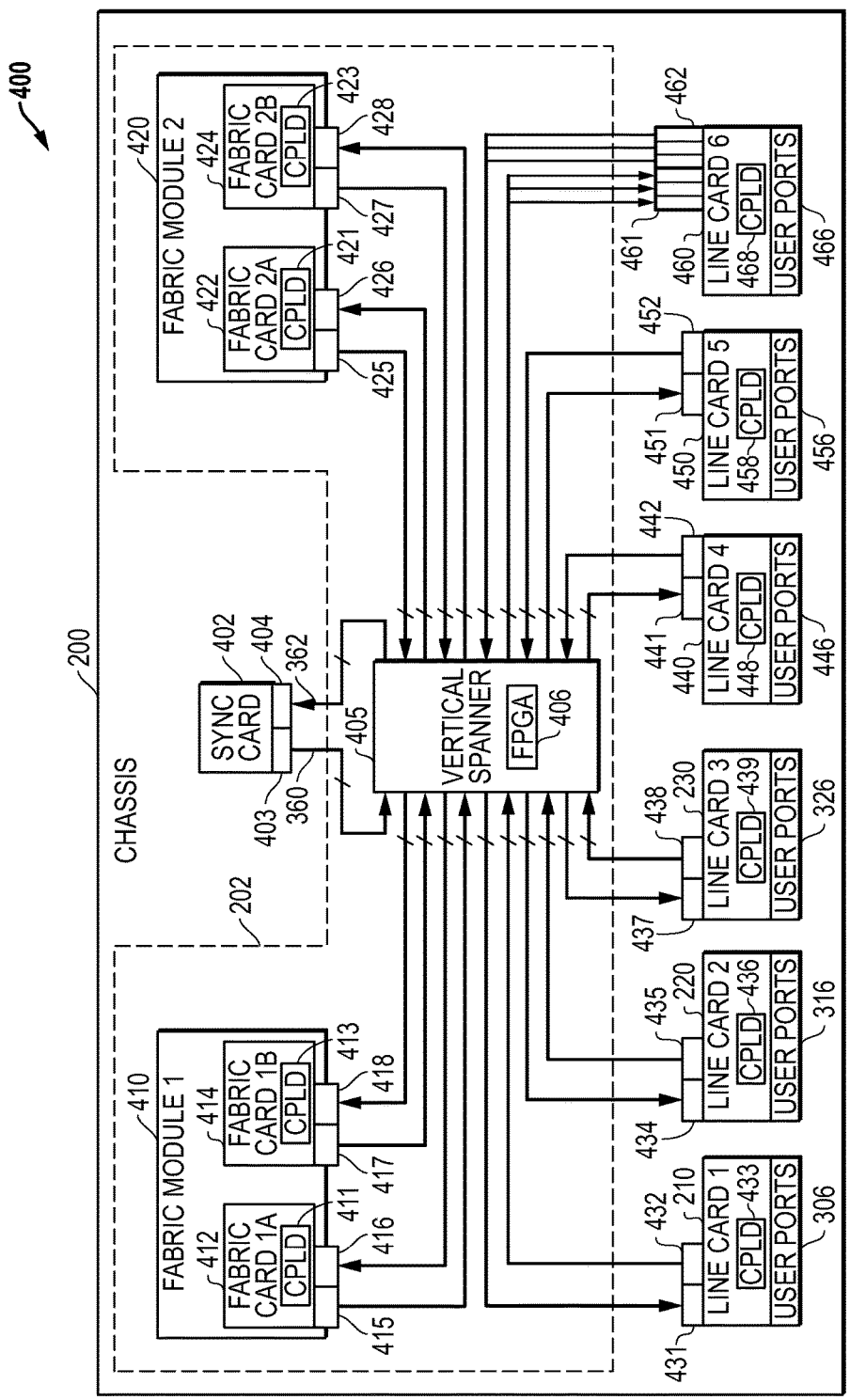
FIG. 4A is a block diagram of an embodiment for a network-connected system having a chassis that includes six line cards, includes and a synchronization card, and implements a switching blade using a vertical spanner and two fabric modules.

FIG. 4A is a block diagram of an embodiment 400 for a network-connected system having a chassis 200 that includes six line cards, includes a synchronization card 402, and implements a switching blade 202 using a vertical spanner 405 and two fabric modules 410 and 412. The synchronization card 402 can be an internal timing source, such as for example, a GPS receiver. The synchronization card 402 can also be an internal timing consumer, as well. The synchronization card 402 communicates with the vertical spanner 405 using output links 403 through connections 360 and using input links 404 through connections 362. The line cards 210, 220, 230, 440, 450, and 460 each include electronic circuitry and input/output user ports (e.g., Ethernet ports) that provide interface connectivity to one or more external network systems, such as the timing consumers shown in FIG. 3A. The fabric modules 410 and 420 include fabric cards 411, 413, 421, and 423, respectively, and these fabric cards in turn include electronic circuitry that provides switching functionality for handling communication traffic (e.g., packet traffic) among the line cards 210/220/230/440/450/460 using the vertical spanner 405.

Looking to the fabric modules, the first fabric module 410 includes a first fabric card 412 having a CPLD 411 and a second fabric card 414 having a CPLD 413. The fabric card 412 communicates with the vertical spanner 405 using configurable output links 415 and configurable input links 416, and the fabric card 414 communicates with the vertical spanner 405 using configurable output links 417 and configurable input links 418. The second fabric module 420 includes a first fabric card 422 having a CPLD 421 and a second fabric card 424 having a CPLD 423. The fabric card 422 communicates with the vertical spanner 405 using configurable output links 425 and configurable input links 426, and the fabric card 424 communicates with the vertical spanner 405 using configurable output links 427 and configurable input links 428. The vertical spanner 405 includes an FPGA 406 that provides configurable links to each of the fabric modules as well as to the line cards. It is further noted that the configurable links for the fabric modules can be associated with and configured through the CPLDs 411/413/421/423 on the fabric cards 412/414/422/424, respectively.

Looking to the line cards, the first line card 210 includes a CPLD 433 and communicates with the vertical spanner 405 using configurable input links 431 and configurable output links 432. The first line card 210 also communicates externally through user ports 306. The second line card 220 includes a CPLD 436 and communicates with the vertical spanner 405 using configurable input links 434 and configurable output links 435. The second line card 220 also communicates externally through user ports 316. The third line card 230 includes a CPLD 439 and communicates with the vertical spanner 405 using configurable input links 437 and configurable output links 438. The third line card 230 also communicates externally through user ports 326. The fourth line card 440 includes a CPLD 448 and communicates with the vertical spanner 405 using configurable input links 441 and configurable output links 442. The fourth line card 440 also communicates externally through user ports 446. The fifth line card 450 includes a CPLD 458 and communicates with the vertical spanner 405 using configurable input links 451 and configurable output links 452. The fifth line card also communicates externally through user ports 456. The sixth line card 460 includes a CPLD 468 and communicates with the vertical spanner 405 using configurable input links 461 and configurable output links 462. The sixth line card 460 also communicates externally through user ports 466. It is further noted that the configurable links for the line cards can be associated with and configured through the CPLDs 433/436/439/448/458/468 on the line cards 210/220/230/440/450/460, respectively.

As shown with respect to the sixth line card 460, the configurable input links 461 and the configurable output links 462 can each include three (3) configurable links. It is further noted that the configurable links for each of the other line cards, as well as the configurable links for each of the fabric cards and the synchronization card, can similarly each include three (3) configurable links. The vertical spanner 405 is connected to these links and can include a configurable link for each of these links. Further, it is again noted that the configurable links for the vertical spanner 405 can be associated with and configured through the FPGA 406 for the vertical spanner 405. In addition, it is noted that different numbers of configurable links could also be implemented and used, as desired.

In operation, the CPLDs 411, 413, 421, and 423 for the fabric cards 412, 414, 422, and 414 control how packets and information is distributed among the line cards 210, 220, 230, 440, 450, and 460. The FPGA 406 for the vertical spanner 405 facilitates this distribution. The CPLDs 433, 436, 439, 448, 458, and 468 for the line cards 210, 220, 230, 440, 450, and 460 control how packets and information is distributed by the line cards to and from the user ports for the respective line card. It is further noted that the CPLDs 433, 436, 439, 448, 458, and 468 for the line cards 210, 220, 230, 440, 450, and 460 can also be configured to be timing sources that generate one or more timing signals based upon packets and/or information associated with communications through the user ports 306, 316, 326, 446, 456, and 466. Further internal timing sources can also be provided by configuring the CPLDs 411, 413, 421, and 423 for the fabric cards 412, 414, 422, and 414 to be timing sources, for example by generating one or more timing signals from packets or information received from the line cards 210, 220, 230, 440, 450, and 460. Further variations could be implemented as desired while still utilizing the configurable timing switch fabric embodiments described herein.

Figure 4B:
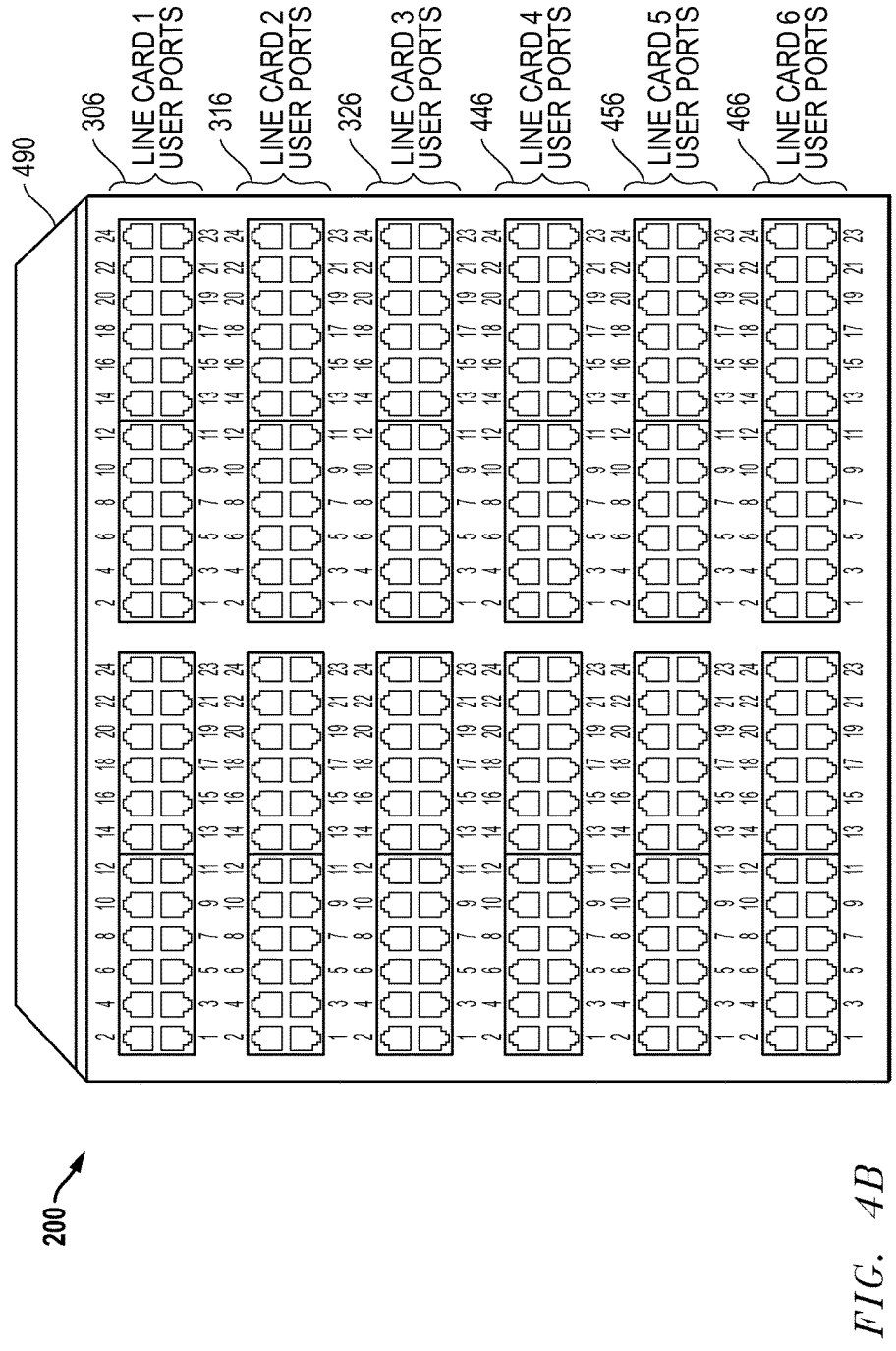
FIG. 4B is a product diagram of an example embodiment for chassis that can be used for the network-connected system of FIG. 4A.

FIG. 4B is a product diagram of an example embodiment for chassis 200 that can be used for the network-connected system of FIG. 4A. For the embodiment depicted, the chassis 200 includes a housing 490 having user ports associated with the six line cards for the embodiment of FIG. 4A. The fabric modules 410/420, the synchronization card 402, the vertical spanner 406, and the line cards 210/220/230/440/450/460 are mounted within housing 490. Additional circuitry, electronic components, and subsystems can also be included within the housing 490, such as for example, fan subsystems, power supply subsystems, interconnection circuitry, control panels, light indicators, and/or other desired circuitry, components, and/or subsystems.

For the example embodiment depicted in FIG. 4B, six sets of user ports are shown with each set have forty-eight (48) ports grouped in two groups of twenty-four (24) ports. User ports 306 are connected to the first line card 210. User ports 316 are connected to the second line card 220. User ports 326 are connected to the third line card 230. User ports 446 are connected to the fourth line card 440. User ports 456 are connected to the fifth line card 450. And user ports 466 are connected to the sixth line card 460. It is noted that different numbers and groups of user ports could be provided, as desired. Further, the ports depicted are RJ45 Ethernet network ports, although other types of ports could also be utilized such as fiber optic ports. Further variations could also be implemented while still utilizing the configurable timing switch fabric embodiments described herein.

Figure 5:
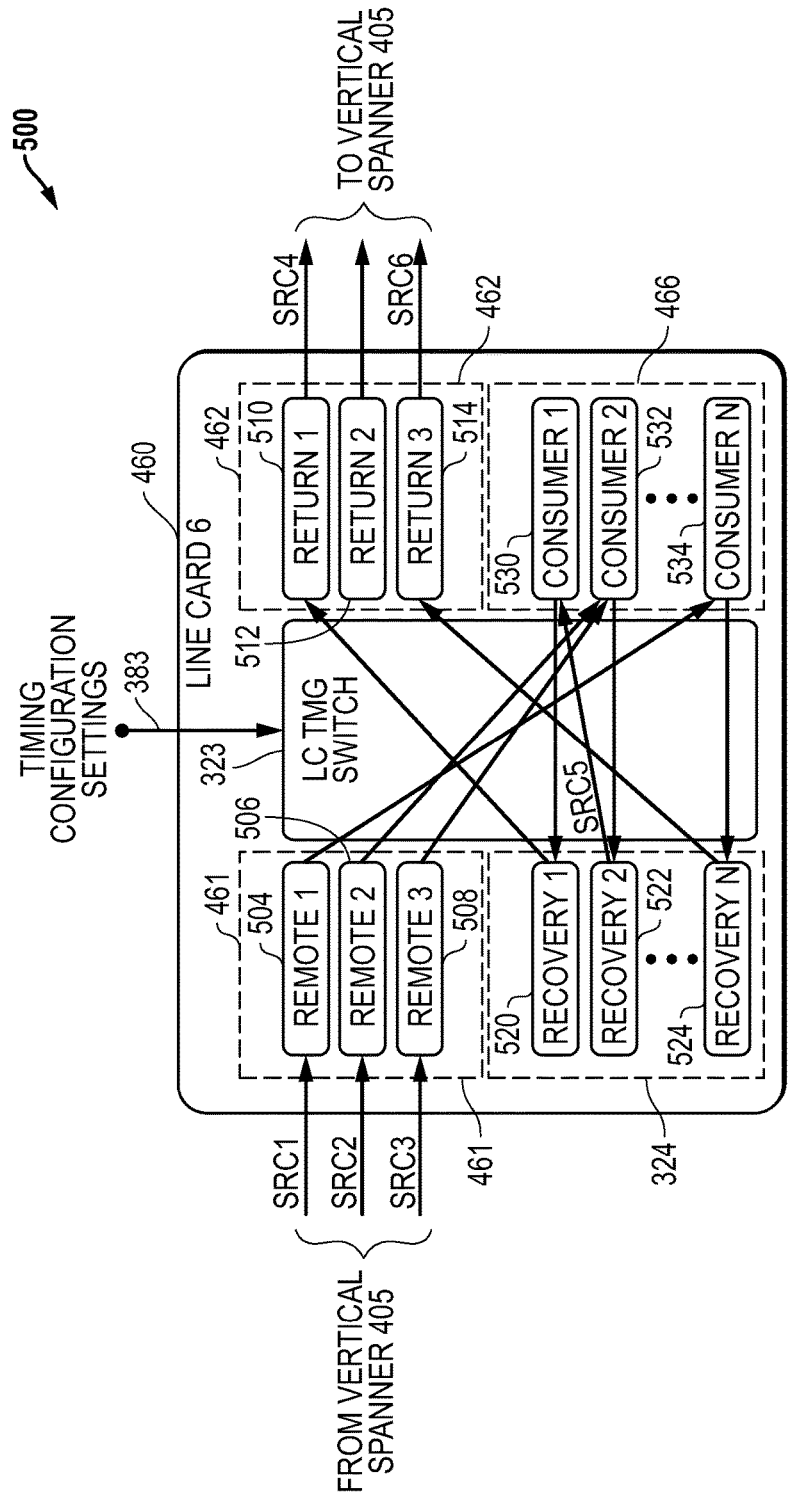
FIG. 5 is a block diagram of an example embodiment for a line card distributing timing information from multiple different timing sources to multiple different consumers and/or destinations.

FIG. 5 is a block diagram of an example embodiment 500 for a line card distributing timing information from multiple different timing sources to multiple different consumers and/or destinations. For embodiment 500, the example line card 460 includes three input remote links 504, 506, and 508 within the input communication links 461 from the switching blade 202. These input remote links 504, 506, and 508 can each receive timing information associated with a different timing source. The line card 460 further includes N different consumer links 530, 532 . . . 534 within user ports 466 that can be connected to one or more external timing consumers. The local timing generator 324 is configured to recover timing information from one or more of the consumer links 530, 532 . . . 534 using one or more of the N recovery blocks 520, 522 . . . 524. As such, each of these N recovery blocks 520, 522 . . . 524 operates as a timing source when it is recovering timing information, and the related timing information is provided to the line card timing switch 323 for distribution to timing consumers according to the timing configuration settings 383 applied to the line card timing switch 323, as described above.

With respect to consumers and/or destinations for the timing information distributed by the line card timing switch 323, the line card 460 includes return links to the switching blade 202 and consumer links. In particular, the line card 460 includes three output return links 510, 512, and 514 within the output communication links 462 to the switching blade 202. These output return links 510, 512, and 514 can each receive timing information from any one of the timing sources received by the line card timing switch 323 as determined by the timing configuration settings 383 applied to the line card timing switch 323, as described above. Each of the N consumer links 530, 532 . . . 534 within the user ports 466 can also receive timing information from any one of the timing sources received by the line card timing switch 323 as determined by the timing configuration settings 383 applied to the line card timing switch 323, as described above.

It is further noted that other line cards within the chassis 200 can similarly be configured to receive timing information from multiple different timing sources through the switching blade 202 and to recover timing information from one or more user ports. This timing information is then distributed by each line card according to the configuration settings applied to that particular line cards. As such, a high degree of configurability is provided. It is further noted that configurable logic devices, such as CPLDs and/or FPGAs, can be used within the line cards 210, 220, 230, 440, 450, and 460 to provide the timing distribution functionality described herein.

Embodiment 500 further depicts example timing information distribution configurations. In particular, timing information from a first source (SRC1) is received at the first remote link 504 and is distributed to the Nth consumer link 534. Timing information from a second source (SRC2) is received at the second remote link 506 and is distributed to the second consumer link 532. Timing information from a third source (SRC3) is received at the third remote link 508 and is also distributed to the second consumer link 532. Timing information from the first consumer link 530 is recovered by the first recovery block 520 to generate timing information for a fourth timing source (SRC4) that is then distributed to the first return link 510. Timing information from the second consumer link 532 is recovered by the second recovery block 522 to generate timing information for a fifth timing source (SRC5) that is then distributed to the first consumer link 530. Timing information from the Nth consumer link 534 is recovered by the Nth recovery block 524 to generate timing information for a sixth timing source (SRC6) that is then distributed to the third return link 514. It is noted that embodiment 500 provides one example embodiment, and other timing distribution configurations could be implemented as desired.

Figure 6:
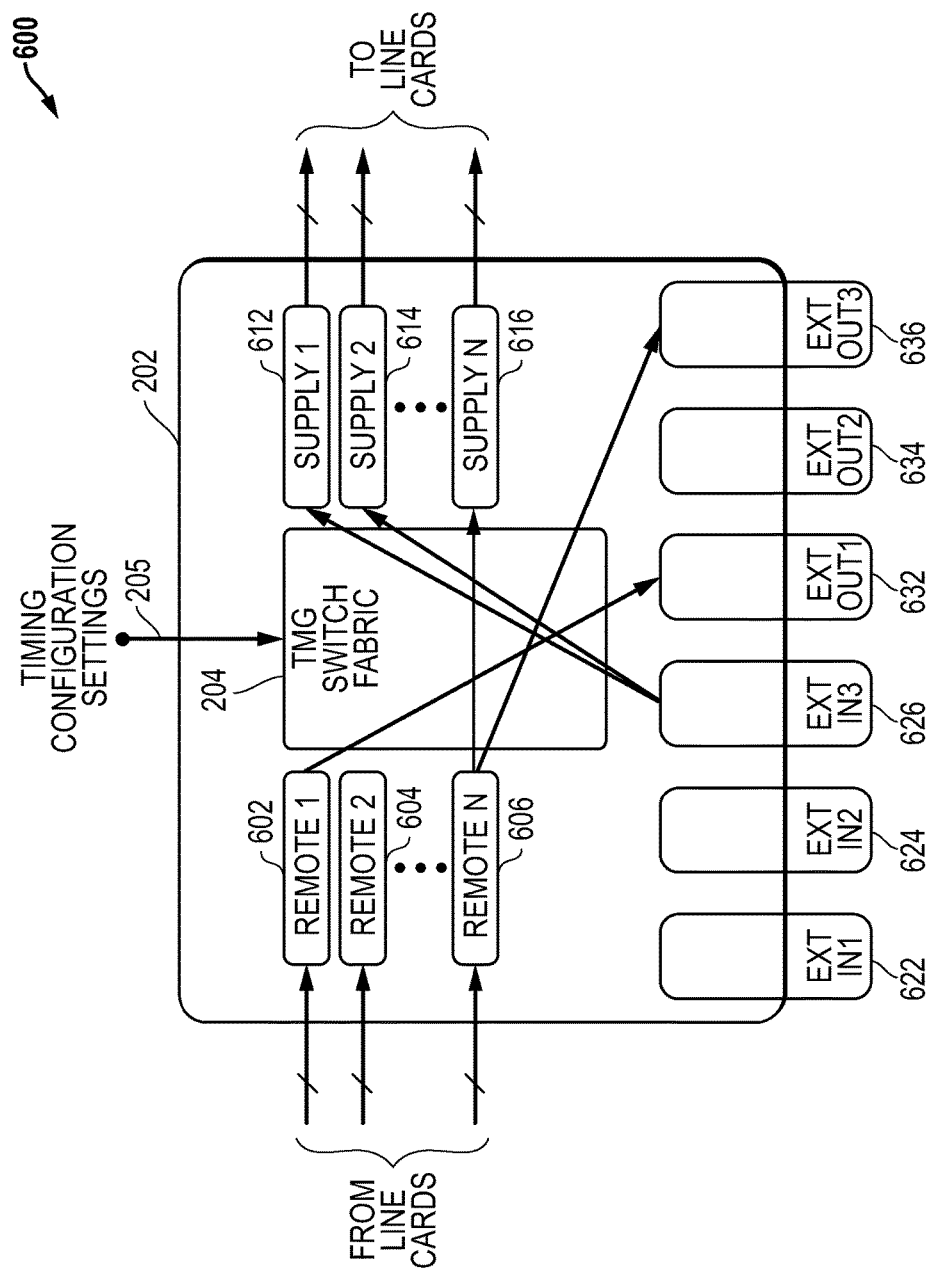
FIG. 6 is a block diagram of an example embodiment for a switching blade distributing timing information from multiple different timing sources to multiple different consumers and/or destinations.

FIG. 6 is a block diagram of an example embodiment 600 for a switching blade 202 distributing timing information from multiple different timing sources to multiple different consumers and/or destinations. For embodiment 600, the switching blade 202 includes N input remote links 602, 604 . . . 606 with each remote link being associated with one of the N line cards. Each of these input remote links 602, 604 . . . 606 includes multiple individual links, such as the three links shown in FIG. 5, that can each receive timing information associated with a different timing source. The switching blade 202 further includes N output supply links 612, 614 . . . 616 with each supply link being associated with one of the N line cards. Each of these input supply links 612, 614 . . . 616 includes multiple individual links, such as the three links shown in FIG. 5, that can each output timing information associated with a different timing source to timing consumers according to the timing configuration settings 205 applied to the timing switch 204, as described above. The switching blade 202 further includes three external input links 622, 624, and 626 that can each receive timing information associated with a different timing source. The switching blade 202 also includes three external output links 632, 634, and 636 that can each output timing information associated with a different timing source to timing consumers according to the timing configuration settings 205 applied to the timing switch 204, as described above. It is noted that configurable logic devices, such as CPLDs and/or FPGAs, can be used within the switching blade 202 to provide the timing distribution functionality described herein.

Embodiment 600 further depicts example timing information distribution configurations. In particular, timing information from a timing source received by the first remote input link 602 is distributed to the first external output link 631. Timing information from a timing source received by the Nth remote input link 606 is distributed to the Nth supply output link 616 and to the third external output link 636. Timing information from a timing source received at the third external input link 626 is distributed to the first supply output link 612 and to the second supply output link 614. It is noted that embodiment 600 provides one example embodiment, and other timing distribution configurations could be implemented as desired.

Figure 7:
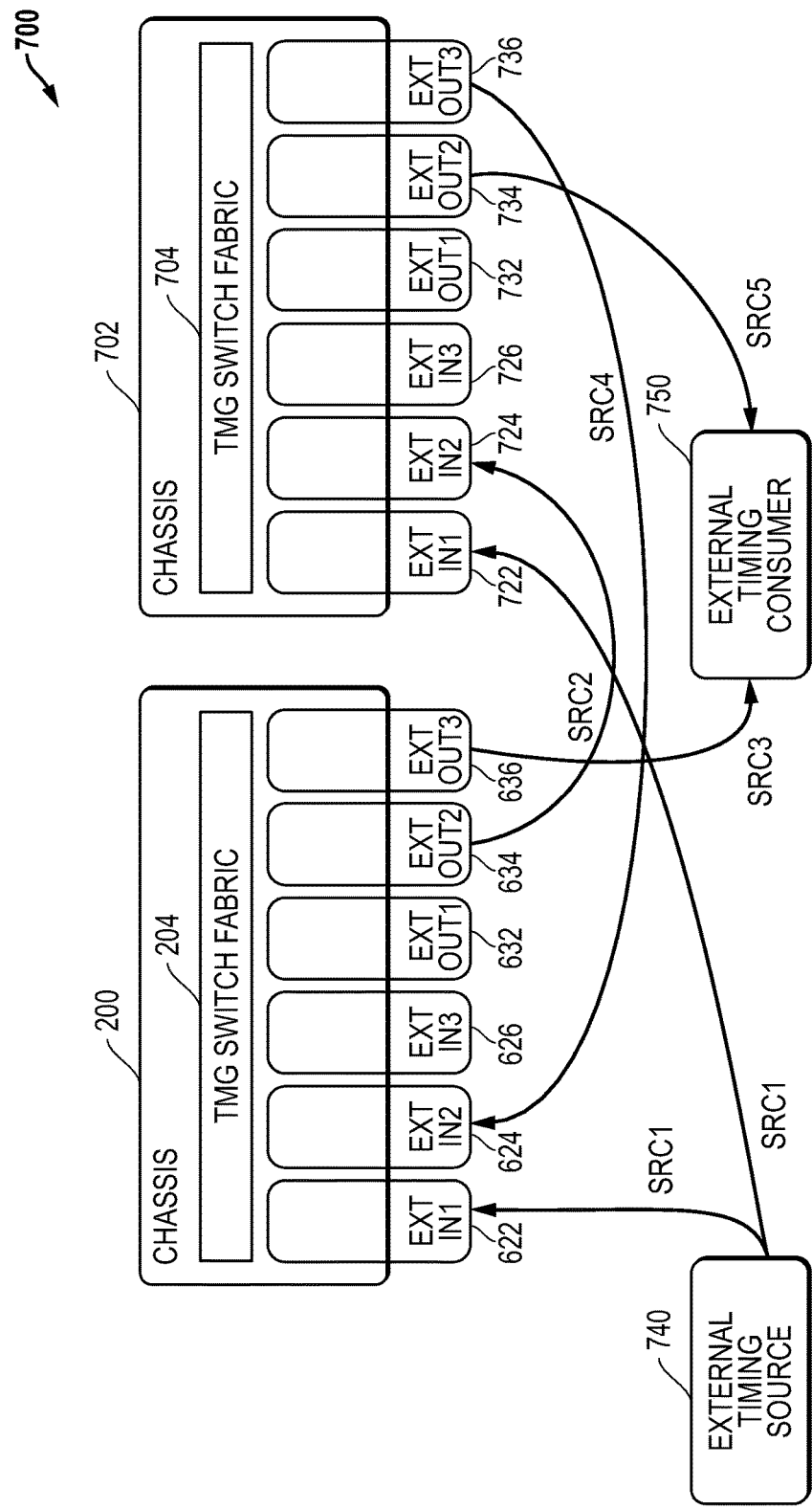
FIG. 7 is a block diagram of an example embodiment for multiple chasses distributing timing information between each other from multiple different timing sources to multiple different consumers and/or destinations.

FIG. 7 is a block diagram of an example embodiment 700 for multiple chasses 200 and 702 distributing timing information between each other from multiple different timing sources to multiple different consumers and/or destinations. Chassis 200 includes timing switch 204 as well as three external input links 622, 624, and 626 and three external output links 632, 634, and 636. Similarly, chassis 702 includes timing switch 704 as well as three external input links 722, 724, and 726 and three external output links 732, 734, and 736. For embodiment 700, only external links and switching blades are depicted for chassis 200 and for chassis 701; however, it is understood that other components such as line cards could also be included within these chasses as described herein. The chassis 200 and the chassis 702 can each be configured to operate as described herein to distribute timing information. It is again noted that configurable logic devices, such as CPLDs and/or FPGAs, can be used within the chassis 200 and the chassis 702 to provide the timing distribution functionality described herein.

Embodiment 700 further depicts example timing information distribution configurations. In particular, timing information for a first timing source (SRC1) from external timing source 740 is received by the first external input link 622 for the chassis 200 and is also received by the first external input link 722 for the chassis 702. Timing information for a second timing source (SRC2) is output from the second external output link 634 for chassis 200 and received by the second external input link 724 for chassis 702. Timing information for a third timing source (SRC3) is output from the third external output link 636 for chassis 200 and received by an external timing consumer 750. Timing information for a fourth timing source (SRC4) is output from the second external output link 736 for chassis 702 and received by the second external input link 624 for chassis 200. Timing information for a fifth timing source (SRC5) is output from the third external output link 734 for chassis 702 and received by the external timing consumer 750. It is noted that embodiment 700 provides one example embodiment, and other timing distribution configurations could be implemented as desired.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, configurable logic devices can be used such as CPLDs (complex programmable logic devices), FPGAs (field programmable gate arrays), ASIC (application specific integrated circuit), and/or other configurable logic devices. In addition, one or more processors running software or firmware could also be used, as desired. For example, computer readable instructions embodied in a tangible medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, processors, programmable circuitry (e.g., FPGAs, CPLDs), and/or other processing devices to perform the processes, functions, and capabilities described herein. It is further understood, therefore, that one or more of the tasks, functions, or methodologies described herein may be implemented, for example, as software or firmware and/or other instructions embodied in one or more non-transitory tangible computer readable mediums that are executed by a CPU (central processing unit), controller, microcontroller, processor, microprocessor, FPGA, CPLD, ASIC, or other suitable processing device or combination of such processing devices.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for a network-connected processing system, comprising:
    at a timing distribution switch within the network-connected processing system:
        receiving timing information from a plurality of timing sources; and
        selectively distributing the timing information to a plurality of processing blades based upon pre-configured distribution settings for the timing distribution switch such that the timing information selectively distributed to each of the plurality of processing blades includes information from two or more of the timing sources; and
    at each of the plurality of processing blades within the network-connected processing system:
        receiving the timing information at a local timing distribution switch; and
        further selectively distributing the timing information to a plurality of user ports based upon pre-configured distribution settings for the local timing distribution switch;
    wherein the timing distribution switch and the plurality of processing blades are coupled within a housing for the network-connected processing system.

2. The method of claim 1, wherein the receiving and selectively distributing steps at the timing distribution switch comprise receiving the timing information from the plurality of timing sources at different ingress ports for the timing distribution switch and forwarding the timing information to egress ports for the timing distribution switch based upon the pre-configured distribution settings for the timing distribution switch.

3. The method of claim 1, wherein the receiving and the selectively distributing steps for each processing blade comprise receiving the timing information from the timing distribution switch at different ingress ports for the local timing distribution switch and forwarding the timing information to egress ports for the local timing distribution switch based upon the pre-configured distribution settings for the local timing distribution switch.

4. The method of claim 1, wherein the plurality of timing sources comprise one or more timing sources external to the housing for the network-connected processing system.

5. The method of claim 1, wherein the plurality of timing sources comprises one or more timing sources internal to the housing for the network-connected processing system.

6. The method of claim 1, further comprising receiving configuration settings for the timing distribution switch from a user interface, storing the configuration settings in one or more configuration files, and using the configuration settings to provide the pre-configured distribution settings for the timing distribution switch.

7. The method of claim 1, further comprising receiving configuration settings for the local timing distribution switches from a user interface, storing the configuration settings in one or more configuration files, and using the configuration settings to provide the pre-configured distribution settings for the local timing distribution switches.

8. The method of claim 1, further comprising generating additional time information with one or more of the processing blades from communications received through one or more of the user ports and sending the additional timing information to the timing distribution switch for the receiving step.

9. The method of claim 1, further comprising selectively distributing the timing information to an external network-connected processing system that also includes a timing distribution switch.

10. The method of claim 1, wherein one or more of the plurality of timing sources comprises an external network-connected processing system.

11. The method of claim 1, wherein at the timing distribution switch, a first protocol is used for the receiving and a second protocol different from the first protocol is used for the selectively distributing.

12. The method of claim 1, wherein at the plurality of processing blades, a first protocol is used for the receiving and a second protocol different from the first protocol is used for the further selectively distributing.

13. The method of claim 1, wherein the timing distribution switch and the plurality of processing blades each comprises one or more processing devices.

14. The method of claim 1, wherein the timing distribution switch and the plurality of processing blades each comprises one or more configurable logic devices.

15. A network-connected processing system, comprising:
a timing distribution switch having a plurality of input ports configured to receive timing information from a plurality of timing sources and having a plurality of output ports, the timing distribution switch being configured to distribute the timing information to the plurality of output ports based upon pre-configured distribution settings such that the timing information includes information from two or more of the timing sources;
a plurality of processing blades each having input ports coupled to receive the timing information from the timing distribution switch, having a local timing distribution switch, and having a plurality of user ports, each processing blade being configured to distribute the timing information to the plurality of user ports based upon pre-configured distribution settings for the local timing distribution switch; and
a timing configuration controller configured to apply pre-configured distribution settings to the timing distribution switch and to each of the processing blades;
wherein the timing distribution switch, the plurality of processing blades, and the timing configuration controller are coupled within a housing for the network-connected processing system.

16. The network-connected processing system of claim 15, wherein the plurality of timing sources comprise one or more timing sources external to the housing for the network-connected processing system.

17. The network-connected processing system of claim 15, wherein the plurality of timing sources comprises one or more timing sources internal to the housing for the network-connected processing system.

18. The network-connected processing system of claim 15, wherein the pre-configured distributions settings for the timing distribution switch are based upon configuration settings stored in one or more configuration files within the network-connected processing system.

19. The network-connected processing system of claim 15, wherein the pre-configured distributions settings for the local timing distribution switches are based upon configuration settings stored in one or more configuration files within the network-connected processing system.

20. The network-connected processing system of claim 15, wherein the plurality of processing blades are configured to generate additional timing information from communications received through one or more of the user ports and to send the additional timing information to the timing distribution switch as one or more of the plurality of timing sources.

21. The network-connected processing system of claim 15, wherein the timing distribution switch is configured to selectively distribute the timing information to an external network-connected processing system.

22. The network-connected processing system of claim 15, wherein one or more of the plurality of timing sources comprises an external network-connected processing system.

23. The network-connected processing system of claim 15, wherein the timing distribution switch is further configured to receive the timing information using a first protocol and to distribute the timing information using a second protocol different from the first protocol.

24. The network-connected processing system of claim 15, wherein the local timing distribution switches are configured to receive the timing information using a first protocol and to distribute the timing information using a second protocol different from the first protocol.

25. The network-connected processing system of claim 15, wherein the timing distribution switch and the plurality of processing blades each comprises one or more processing devices.

26. The network-connected processing system of claim 15, wherein the timing distribution switch and the plurality of processing blades each comprises one or more configurable logic devices.

27. The method of claim 1, wherein the local timing switch comprises a plurality of remote communication links configured to receive the timing information from the timing distribution switch and a plurality of return communication links configured to provide additional timing information to the timing distribution switch.

28. The network-connected processing system of claim 15, wherein the local timing switch comprises a plurality of remote communication links configured to receive the timing information from the timing distribution switch and a plurality of return communication links configured to provide additional timing information to the timing distribution switch.

29. The method of claim 1, wherein the timing information from the plurality of timing sources received by the timing distribution switch comprises information based upon at least one of GPS (Global Positioning System) timing signals, GNSS (Global Navigation Satellite System) timing signals, a time code communication format, or a packet-based timing protocol.

30. The network-connected processing system of claim 15, wherein the timing information from the plurality of timing sources received by the timing distribution switch comprises information based upon at least one of GPS (Global Positioning System) timing signals, GNSS (Global Navigation Satellite System) timing signals, a time code communication format, or a packet-based timing protocol.

* * * * *